INVENTOR.
Orville B. Sherman
BY J. R. Nelson
Leonard D. Soutier
ATTORNEYS

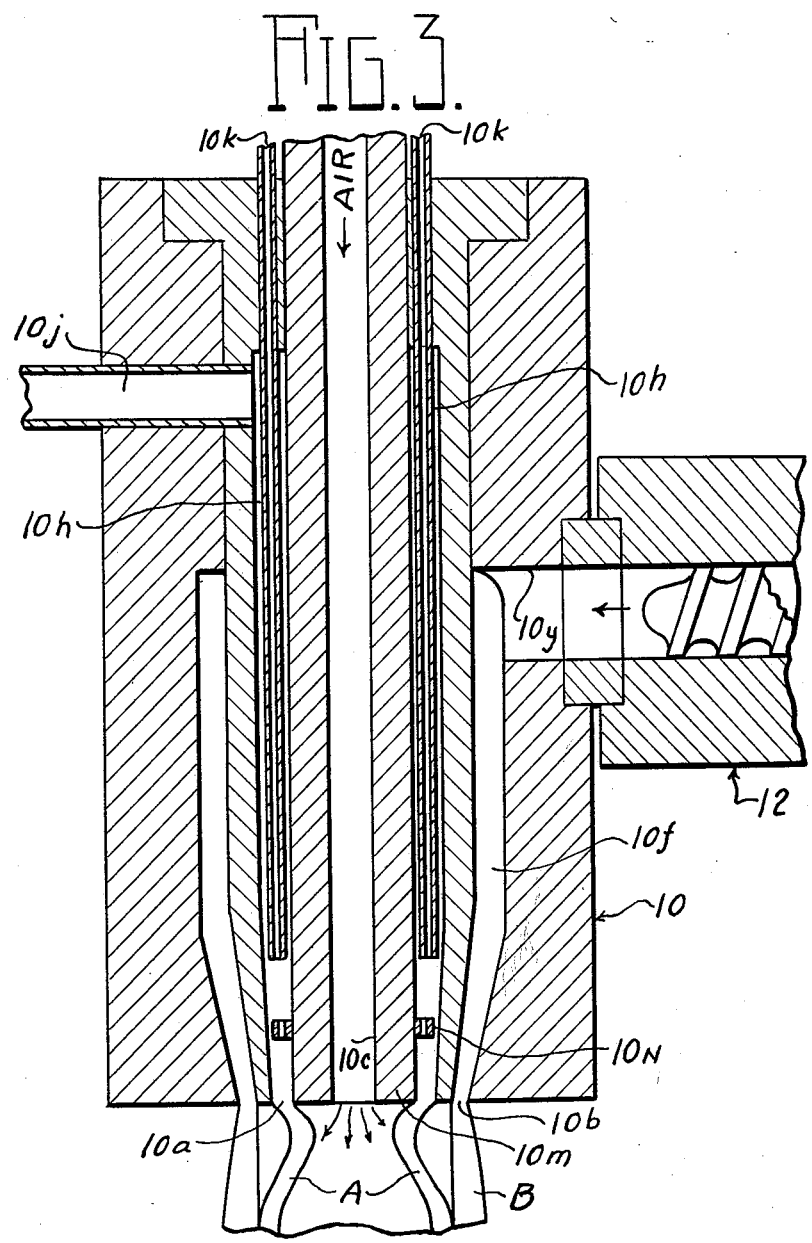

March 26, 1963   O. B. SHERMAN   3,082,484
METHOD FOR LAMINATE FORMING HOLLOW PLASTIC ARTICLE
FROM MATERIALS OF DIFFERENT VISCOSITIES
Original Filed Oct. 2, 1956   3 Sheets-Sheet 3
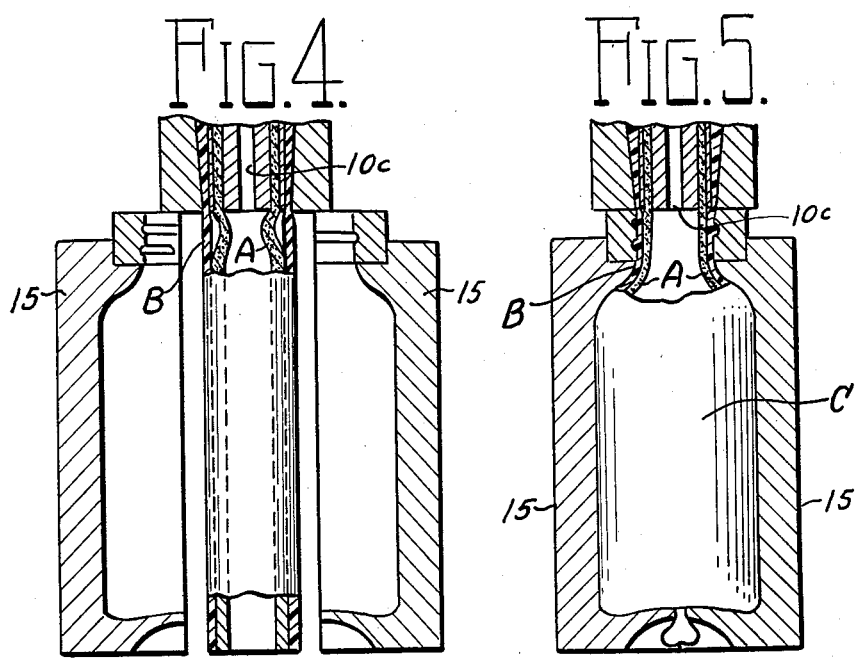
LEGEND
SECTION of NYLON
ELEVATION of "
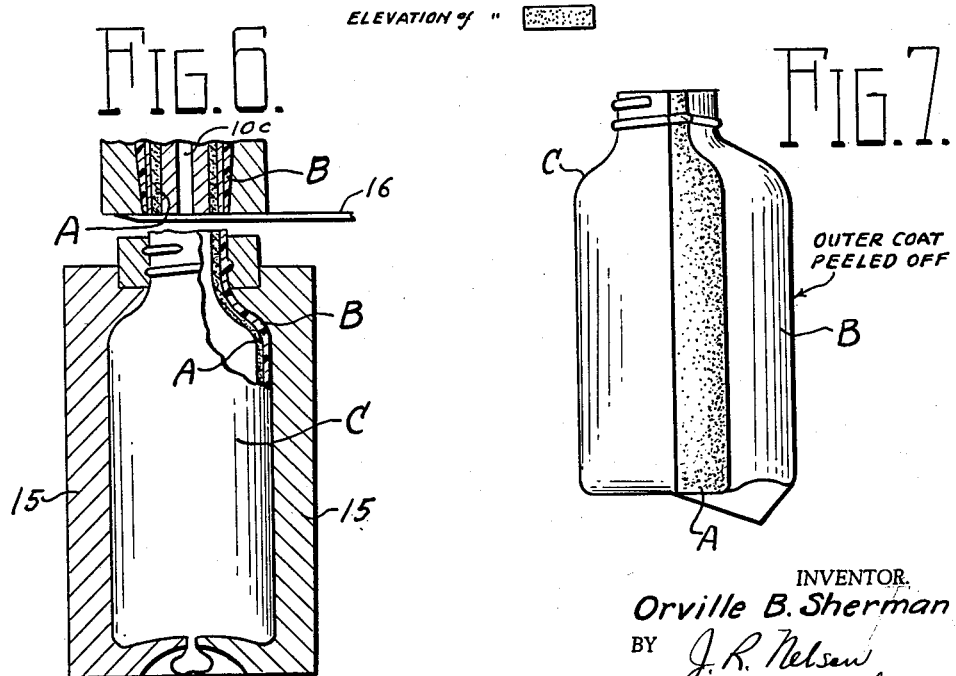
INVENTOR.
Orville B. Sherman
BY J. R. Nelson
 + Leonard O. Saulnier
ATTORNEYS 3,082,484
METHOD FOR LAMINATE FORMING HOLLOW PLASTIC ARTICLE FROM MATERIALS OF DIFFERENT VISCOSITIES
Orville B. Sherman, West Orange, N.J., assignor to Owens-Illinois Glass Company, a corporation of Ohio
Continuation of application Ser. No. 613,525, Oct. 2, 1956. This application Feb. 13, 1959, Ser. No. 793,085
4 Claims. (Cl. 18—55)

This invention relates to an improved method for forming plastic articles by blow molding technique, and particularly plastic containers having a wall formed of a low viscosity plastic that is normally not susceptible to blow forming.

The present application is a continuation of my copending application, Serial No. 613,525, filed October 2, 1956, now abandoned the latter-mentioned application to be presently abandoned.

There are a variety of well-known plastic materials having properties which make them very desirable for use as containers, but these materials have such low viscosities as to be incapable of being formed by economical blow-molding techniques presently employed on higher viscosity thermoplastic materials. A prime example of such material is nylon which, while thermoplastic, has such low viscosity, cohesion and tensile strength when heated to a formable state as to be incapable of expansion into container formations by blow mold methods.

Accordingly, it is an object of this invention to provide an improved method for blow forming articles utilizing thermoplastic materials which are not normally susceptible to blow forming.

Another object of this invention is to provide an improved method for forming multiple-ply plastic containers by a blowing process wherein the material of one ply of the container wall comprises a thermoplastic not normally susceptible to blow forming and the other ply of the container wall constitutes a thermoplastic material susceptible to blow forming, which functions as a carrier for the first-mentioned thermoplastic material.

Another object of this invention is to provide an improved method of extruding a thermoplastic material of low viscosity and cohesion by forming a liquid mixture of an incompletely reacted form of such material and catalyst and simultaneously heating and issuing said mixture into a tubular flow which is supported by a concurrently extruded tubular formation of a more viscous and cohesive thermoplastic.

A still further object basic to the present invention is the provision of improved method for extruding thermoplastic material wherein the extruding thermoplastic material is issued in tubular form and thereupon expanded by pressure applied internally of the issued form. This mentioned expansion precedes final blow forming the tubular form into a final shape within a mold.

The specific nature of this invention, as well as other objects and advantages thereof, will become apparent to those skilled in the art from the following detailed description, taken in conjunction with the annexed sheets of drawings on which, by way of preferred example only, are illustrated several embodiments of the invention.

On the drawings:

FIG. 3 is a schematic sectional view of a modified form of extruder for forming concentric tubular formations of plastic material, in accordance with one step of this invention.

FIG. 4 is a schematic sectional view, illustrating the step of the method of this invention of enclosing the extruded tubular plastic formations in a mold.

FIG. 5 is a schematic sectional view, illustrating the step of the method of this invention of blowing the extruded plastic material to the form of a mold.

FIG. 6 is a view similar to FIG. 5, illustrating the severance of the blown container from the extruded tubular formations.

FIG. 7 illustrates an embodiment of this invention, as applied to the formation of a single-wall container, by the further step of peeling off one wall of the double-walled container.

The method consists generally in the steps of continuously extruding concentric formations of dissimilar plastic materials, one of such materials being of the type that is not normally susceptible to blow forming and the other material being readily susceptible to blow forming. Two concentric tubular formations are then brought into intimate peripheral engagement, and the one material that is susceptible to forming by blow molding can then function as a carrier for the other material. Successive lengths of the joined tubular formations are then enclosed in a suitable blow or vacuum mold and expanded to conform to the configuration of the mold, by the application of fluid pressure. The method of this invention is particularly adaptable to the formation of containers having at least one wall ply formed of nylon.

As is well known in the art, all common varieties of nylon cannot be successfully formed into container shapes by blow-molding technique due to their inherent low viscosity, cohesion and tensile strength upon being heated sufficiently to become thermoplastic. As applied to the manufacture of nylon containers, this invention contemplates the simultaneous extrusion of a tubular formation of nylon in concentric relationship to a tubular formation of a material susceptible to blow forming, such as polyethylene. In the immediate vicinity of the concentrically arranged extrusion nozzles, the respective tubular formations are radially deflected into intimate surface engagement, and hence, the polyethylene tube functions as a carrier for the nylon tube during the subsequent blow-forming operations. As may be desired, a single-wall nylon container can then be formed by peeling off the adhering layer of polyethylene, and the peeled-off polyethylene reused in the subsequent production of additional nylon containers.

In the following detailed description of various embodiments of this invention, the plastic material which is not readily susceptible to blow forming is consistently shown as constituting the innermost of the two extruded tubular formations; however, it should be distinctly understood that this representation is merely for consistency of illustration. This invention is equally applicable to arrangements wherein the material that is not susceptible to blow forming, such as nylon, constitutes the outermost of the concentric tubular formations. If the method is practiced under the later-mentioned circumstances, the characteristic plasticity of a carrier, such as polyethylene, normally caused said material to radially expand at the point of extrusion, thereby facilitating the attainment of an intimate peripheral contact between the tubular formations.

Figure 1:
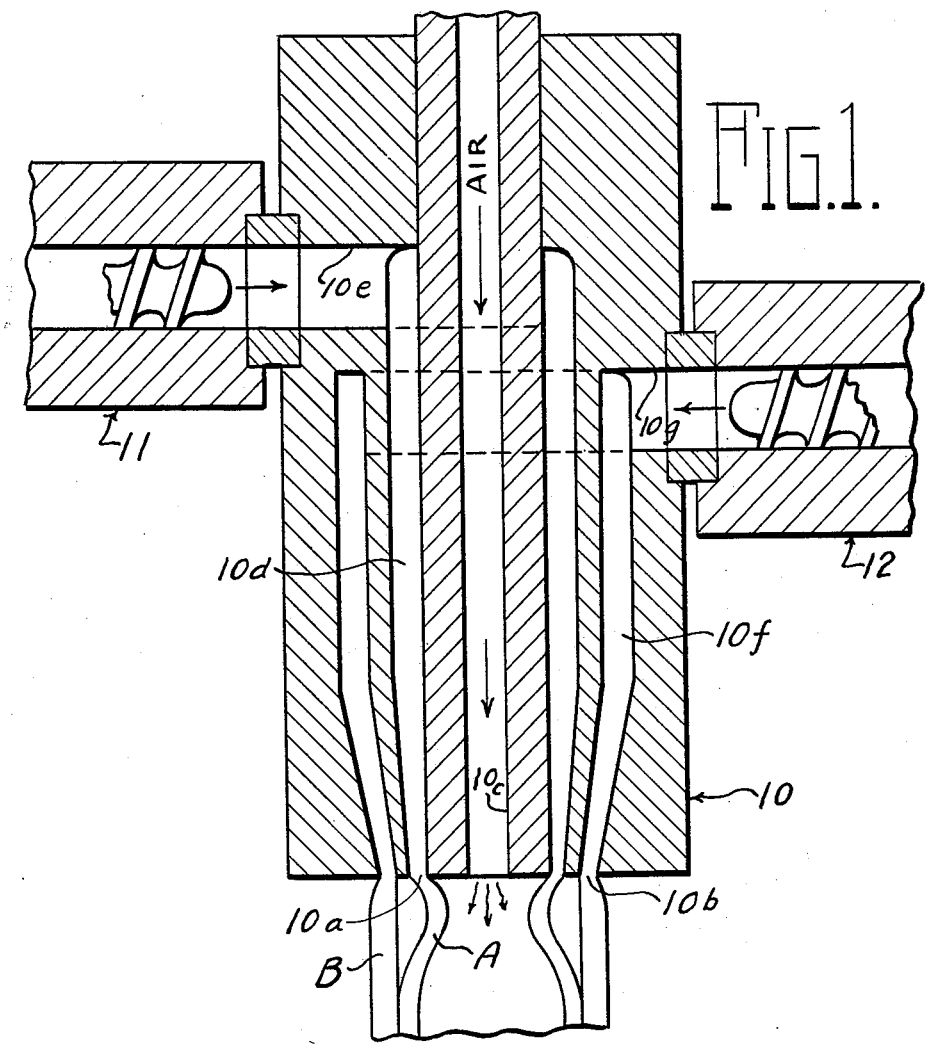
FIG. 1 is a schematic sectional view of an extruder for producing concentric tubular formations of plastic materials in accordance with the first step of this invention.

In FIG. 1, a reference numeral 10 indicates an extruder nozzle defining a pair of concentric annular extruding orifices 10*a* and 10*b*. Additionally, a central passage 10*c* is provided in nozzle 10 for a purpose to be hereafter described. Orifice 10*a* communicates with an axial passage 10*d*, which, at its remote end, is joined by radial passage 10e to the outlet of an extruder 11. Similarly, orifice 10b is in communication with an axial passage 10f which is connected by radial passage 10g to a second extruder 12.

Extruder 11 supplies material to orifice 10a, which is, of its nature, not readily susceptible to blow forming, such as nylon. Extruder 12 supplies material to orifice 10b, said material being by its nature readily susceptible to blow forming, such as polyethylene, both materials being sufficiently heated in their respective extruders or during passage through nozzle 10 to provide the necessary degree of thermoplasticity to permit their extrusion in tubular formation. As indicated by formations A and B, the central axial passage 10c permits the flow of pressured air therethrough to force the tubular formation A radially outwardly into intimate peripheral surface engagement with the outer tubular formation B.

Figure 2:
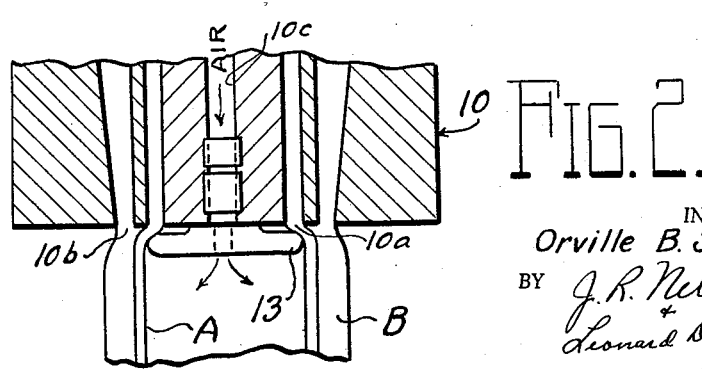
FIG. 2 is a partial view of the orifice portion of the extruder of FIG. 1, illustrating a modification of this invention.

Alternatively, as illustrated in FIG. 2, enlarged mandrel tip 13 is inserted into central annular passage 10c in axially spaced relationship relative to orifice 10a, tip 13 being greater in diameter than orifice 10a, so as force the tubular formation A extruded at orifice 10a to flow radially outwardly and into peripheral engagement with formation B. The size of the orifice opening 10a may be controlled by axial positioning of the mandrel and its attached tip 13 to control the rate of issuance of the material from orifice 10a, and ultimately control thereby the thickness of the inner tubular extrusion A.

As illustrated in FIG. 4, when a sufficient length of the joined tubular formations A and B have been extruded from nozzle 10, such joined formations are enclosed in conventional fashion by blow mold 15. Blow mold 15 is closed on the tubular formation as indicated in FIG. 5, and pressure fluid is applied through central axial passage 10c to expand the joined tubular formations A and B together to conform to the configuration of blow mold 15. Obviously, blow mold 15 may also be of the vacuum type, wherein atmospheric pressure within the inner tubular formation A is effective to expand both formations A and B to conform to the mold 15.

As shown in FIG. 6, a severing member 16 is passed transversely between nozzle 10 and mold 15 to sever the formed container from the extruded formations A and B. Mold 15 is then opened in conventional fashion to release the formed container having a two-ply wall which may comprise plastics of radically different characteristics, such as nylon and polyethylene.

In the event that it is desired to produce a single-wall container of nylon, as illustrated in FIG. 7, it is only necessary to sever the polyethylene wall B by making one or more axial cuts, as indicated at 17, and then strip the polyethylene layer B away from the nylon layer A, leaving a completely formed container of nylon material.

Referring to FIG. 3, a modification of the extruding step of this invention is represented. Again, the innermost annular orifice 10a is utilized to extrude or issue in the form of a tubular formation the material A that is not susceptible to blow forming. Nozzle 10a communicates directly with an enlarged annular chamber 10h which communicates with a source of partially reacted resinous material through a radial pipe 10j. A plurality of axial tubes 10k are inserted into chamber 10h, and are utilized to introduce a suitable catalyst to form a mixture with the partially reacted resinous material. The central core 10m of extruder nozzle 10 is preferably mounted for rotation, and an annular mixing baffle 10n is provided on core 10m at a position axially adjacent to the orifice 10a. Hence, an intimate mixture of the catalyst and the partially reacted resinous material is achieved in the annular chamber 10h. Sufficient heat is supplied to initiate polymerization of the partially reacted material concurrently with its extrusion to form tubular formation A through orifice 10a.

From the foregoing description it will be apparent that this invention provides a simple and economical method of blow forming hollow plastic articles from thermoplastic materials that are not ordinarily susceptible to blow forming. Hence, the method of this invention permits the commercial utilization of this large class of plastic materials in a variety of forms that have heretofore been impractical to manufacture on an economical basis.

Various modifications may be resorted to within the spirit and scope of the appended claims.

I claim:

1. The method of forming a nylon container comprising extruding a first tubular formation of polyethylene, extruding a second tubular formation of nylon concentrically and within said first tubular formation, forcing said tubular formations into intimate surface contact, whereby said polyethylene material acts as a carrier for said nylon material, enclosing a length of said joined tubular formations in a mold and expanding said formations to conform to said mold, thereby producing a double-walled container, axially severing said outer container wall formed of polyethylene, and stripping said polyethylene from said nylon inner wall.

2. The method of forming a plastic container from a thermoplastic material that is independently incapable of blow forming comprising extruding a first tubular formation of another thermoplastic material that is susceptible independently of blow forming, extruding a second tubular formation of said first plastic material concentrically and within said first tubular formation, deflecting the second tubular formation after extrusion into peripheral surface contact with said first tubular formation, whereby said first tubular formation acts as a carrier for the deflected material of the said second tubular formation, enclosing a length of said tubular formations in a mold and expanding them to conform to said mold, thereby producing a double-walled container, axially severing the outer container wall formed from said first tubular formation, and stripping the severed outer container wall from the inner wall.

3. The method of forming a container of a polyamide material which comprises concentrically extruding tubular formations of polyethylene and a polyamide material one within the other, whereby said polyethylene is the outermost formation and acts as a carrier for said polyamide material, enclosing a length of said concentric tubular formations in a mold, expanding said tubular formations to the shape defined by said mold, and stripping the outer formation from said inner formation.

4. The method of forming a blown plastic container of a multiple-ply wall of dissimilar plastic materials nonadherent one to the other, one of said materials forming a wall ply of the container wall for providing supporting strength to the container and the other said material forming a lining ply of the container wall for lining the wall ply thereof, which comprises extruding a tubular formation of a thermoplastic material that is in a condition of plasticity to permit expansion and setting in predetermined form from an outer annular orifice, the leading end of said formation being open; issuing an annular formation of a thermoplastic mixture through an inner orifice concentric with said outer orifice and coplanar therewith, said annular formation issuing coextensively with the tubular formation and being thin in cross-section compared with the tubular formation, and said mixture being in a fluid state and having sufficiently low viscosity to be incapable of being independently expanded and set in predetermined form; puffing said annular formation by uniformly applying pressure in a radial direction from the inside of the annular formation at the time of its issuance from said inner orifice to provide for keeping its leading end open and enlarge that formation into peripheral contact coextensive to the tubular formation, thereby coating the inner surface of the latter with said mixture; enclosing a length of the tubular formation after it is coated in a partible mold, thereby pinching and sealing the coated tubular formation at a point thereon and leaving an end of the coated tubular formation open; and expanding the mold-enclosed length of the coated tubular formation in the mold by fluid pressure to form a container comprised of an outer wall ply and a relatively thin inner lining ply.

References Cited in the file of this patent

UNITED STATES PATENTS

| | | |
|---|---|---|
| 2,706,308 | Lorenz | Apr. 19, 1955 |
| 2,710,987 | Sherman | June 21, 1955 |
| 2,750,625 | Colombo | June 19, 1956 |
| 2,756,461 | Hadley | July 31, 1956 |
| 2,781,551 | Richerod | Feb. 19, 1957 |
| 2,809,393 | Hauptman | Oct. 15, 1957 |

FOREIGN PATENTS

| | | |
|---|---|---|
| 1,025,834 | France | Apr. 20, 1953 |
| 522,838 | Italy | Apr. 12, 1955 |